UNITED STATES PATENT OFFICE.

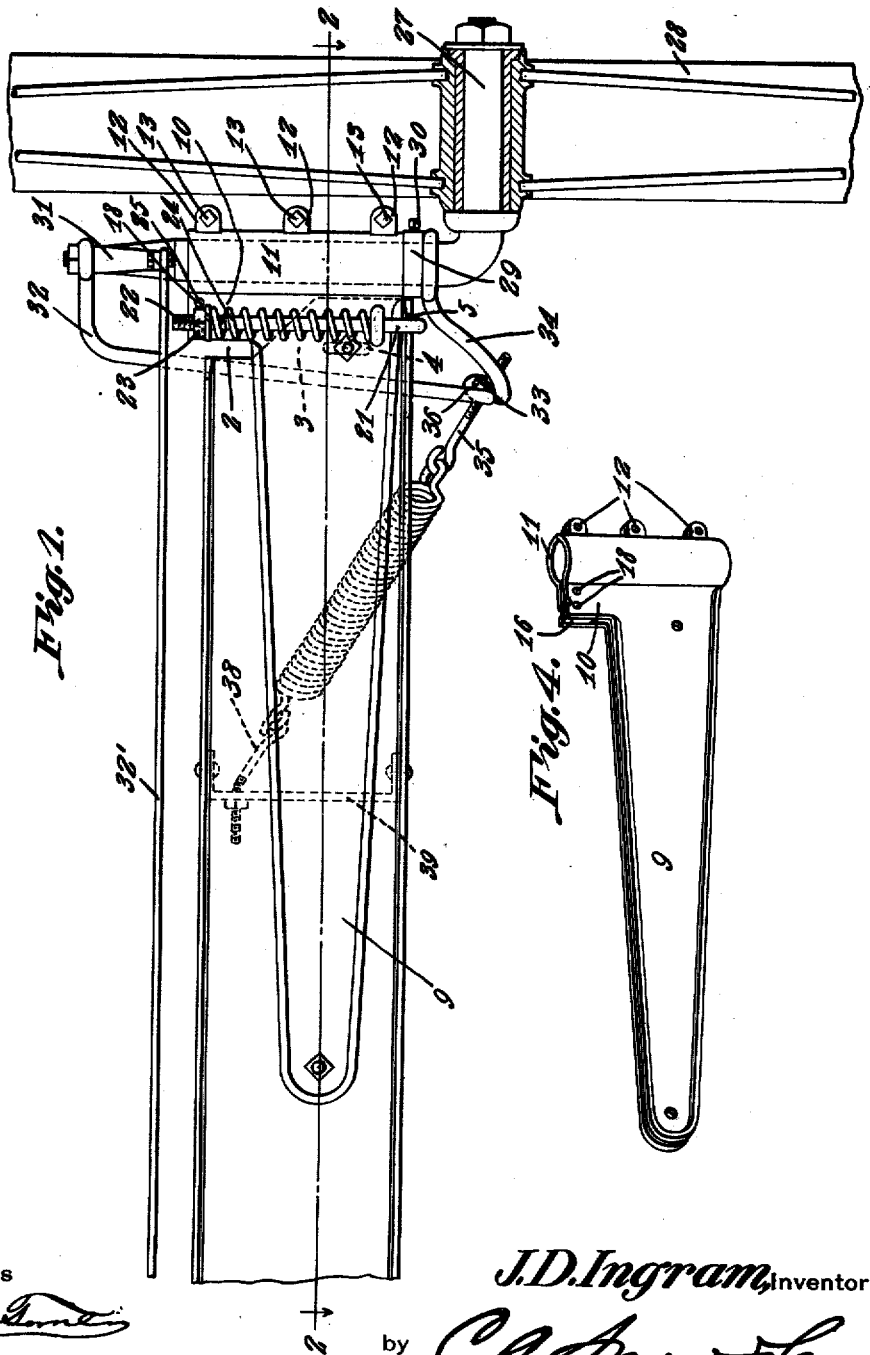

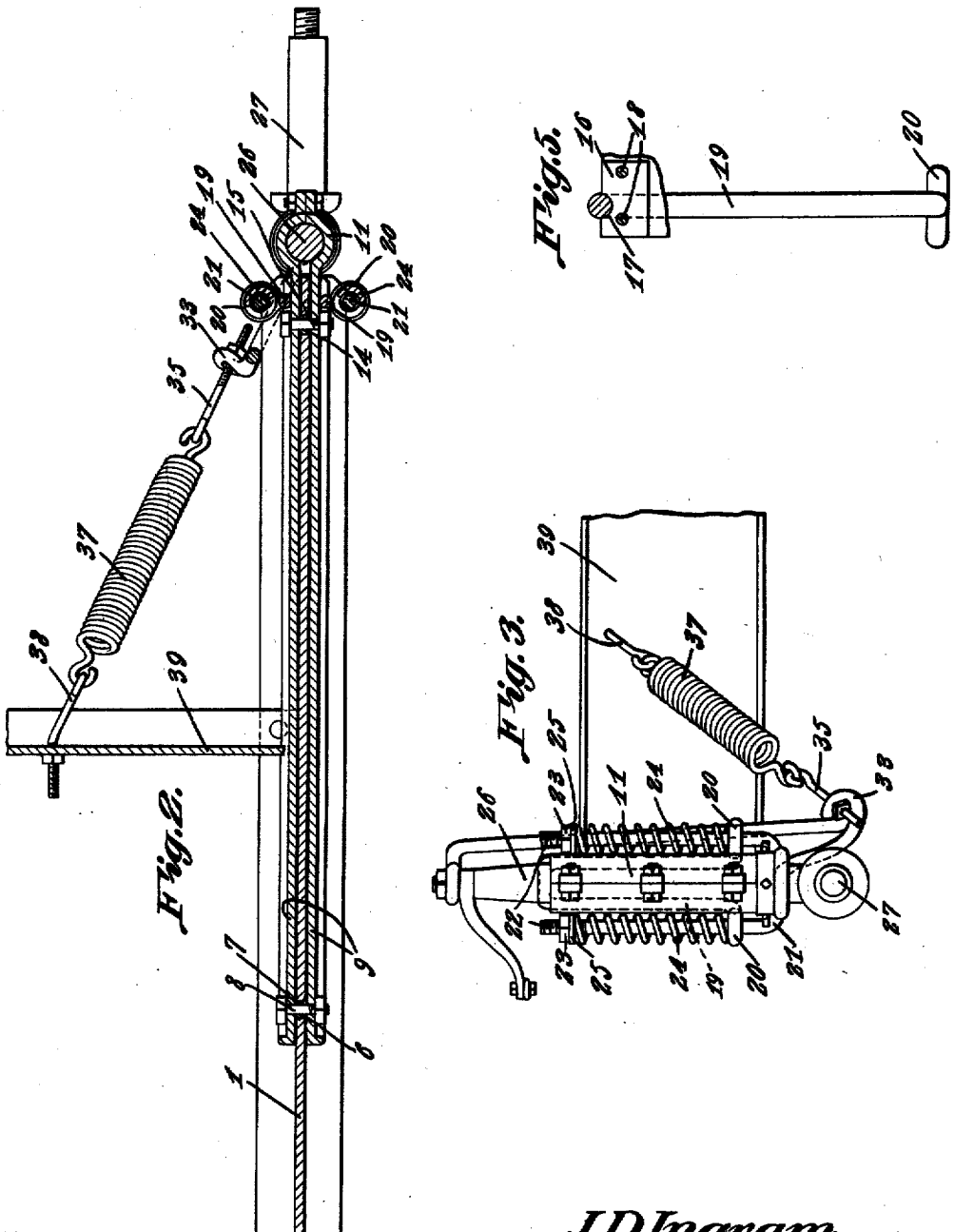

JOSEPH D. INGRAM, OF AMARILLO, TEXAS.

MOTOR-VEHICLE.

1,312,733.  Specification of Letters Patent.  Patented Aug. 12, 1919.

Application filed November 28, 1917. Serial No. 204,413.

*To all whom it may concern:*

Be it known that I, JOSEPH D. INGRAM, a citizen of the United States, residing at Amarillo, in the county of Potter and State of Texas, have invented a new and useful Motor-Vehicle, of which the following is a specification.

This invention relates to motor vehicles, its primary object being to provide cushioning means for the steering wheel of a tractor, or the like, such as is shown for example in my co-pending application filed October 24, 1916, Serial No. 127,449.

A further object is to provide simple and efficient means for assembling the steering wheels of a motor vehicle with the chassis, said means being compact and durable and permitting desirable relative up and down movement for the absorption of shocks.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:

Figure 1 is an elevation of a portion of a chassis having the present improvement combined therewith, the supporting wheel being shown in section and having parts broken away.

Fig. 2 is a section on line 2—2 Fig. 1, the holding springs being shown in plan and the supporting wheels being removed.

Fig. 3 is a side elevation of the structure shown in Figs. 1 and 2, the supporting wheels being removed.

Fig. 4 is a perspective view of the axle engaging lever.

Fig. 5 is a longitudinal section through part of the upper portion of said lever and showing the saddle block engaged by the upper yoke, shown in section.

Referring to the figures by characters of reference 1 designates an I-beam constituting a portion of the axle of a motor vehicle or the like. It is to be understood that a steering wheel is to be provided at each end of the axle but as both will be mounted in the same manner, it has been deemed necessary to illustrate only one of them. As shown in Fig. 1 the end of the axle has its upper portion cut away as at 2 so that the lower portion of said end will form a wing 3 the upper edge of which is inclined outwardly and downwardly while formed within this wing is a vertical slot 4. Notches 5 are formed in the bottom flanges of the beam 1 where they extend across the wing 3.

Formed within the beam 1 back from the end thereof is an opening 6 and seated in this opening is a spacing sleeve 7 through which extends a pivot bolt 8. This bolt engages the inner ends of tongues 9 which extend along opposite faces of the beam 1 and terminate at their outer or free ends in enlargements 10 which are offset laterally so that when said enlargements are brought together, the offset portions will form a split sleeve 11. Ears 12 may be extended from the ends of the tongues and by extending bolts 13 through these ears the two tongues can be fastened together securely at their outer ends. A spacing sleeve 14 is slidably mounted in the slot 4 and is mounted upon a bolt 15 which extends through the tongues 9 and serves to bind them upon the ends of the sleeve. A saddle block 16 is arranged between the upper edges of the enlargement 10 of the tongues 9 and this saddle block as well as the edges, is notched as at 17. See Fig. 5. The saddle block may be held in place by rivets 18 or in any other manner desired.

Resting in the notches 17 is the intermediate portion of a U-shaped hanger or yoke 19 which straddles the lever formed by the tongues 9 and has laterally extending eyes 20 at its lower ends. Slidably mounted in these eyes are the sides of a yoke 21 which extend under the beam 1 and are seated in the notches 5, the upper ends of these sides of the yoke 21 being screw-threaded as shown at 22 and engaged by nuts 23. Coiled springs 24 are mounted on the sides of the yoke 21 and bear at one end against the nuts 23 or against washers 25 arranged under the nuts and, at their other ends, upon the eyes 20.

Mounted for rotation within the sleeve made up of the opposed offset portions 11 is a stem 26 from the lower end of which extends a spindle 27 adapted to project through the hub of a supporting wheel 28. A collar 29 is mounted on the lower portion of the stem 26 and is engaged by the lower end of the sleeve 11, this collar being adjustable and held in position by a set screw 30 or the like.

The upper end of the stem 26 is extended above the sleeve 11 and fixedly secured to the stem in any manner desired is an arm 31 to which the cross rod 32' of the steering mechanism is pivotally secured. Fixedly connected to the upper end of the stem 26 and extending downwardly across one face of the beam 1 is a rod 32 the lower end portion of which is bent to form an eye 33 and terminates in an arm 34 which is mounted on the lower portion of the stem 26. Extending through the eye 33 is an eye-bolt 35 held in place by a nut 36 or in any other manner desired and attached to one end of a coiled spring 37. The other end of this coiled spring is attached to an eye-bolt 38 which extends through one side 39 of the chassis and is adjustably connected to it. This bolt 38 is preferably located above and beyond the eye 33 so that the spring 37, which is normally under tension, will exert an upward and longitudinal pull upon the eye 33 thus to resist the binding action which would otherwise occur between the stem 26 and the sleeve 11 due to the fact that said stem and sleeve are located inwardly from the supporting wheel 28.

It will be obvious that by shifting the rod 32' longitudinally, the stem 26 would be rotated thus to cause the wheel 28 to turn in any direction desired for the purpose of steering the vehicle. By having a rod 32' connected to the arm 31 at both ends of the axle, both supporting wheels can be turned together. This action is the same as that of an ordinary motor vehicle. By having the stem 26 mounted in the sleeve 11, however, said sleeve is free to move relative to the beam or axle 1 and, when passing over a rough surface, the end of the axle can sag downwardly pulling with it the yoke 21 and causing the shock-absorbing springs 24 to become compressed between the washers 25 and the eyes 20. This relative movement is permitted by reason of the pivotal connection between the tongues 9 and the beam 1, such movement being limited by the end walls of the slot 4.

While this shock-absorbing connection for the steering wheels is designed primarily for use in connection with tractors and like machines, it is to be understood that it can be used equally as well with ordinary automobiles.

What is claimed is:—

1. The combination with an axle having a projecting wing, of a split sleeve, spaced tongues extending therefrom and along opposite faces of the axle, a pivotal connection between the tongues and axle, oppositely disposed yokes slidably connected, one of said yokes straddling and extending downwardly from the tongues and the other yoke straddling the bottom of and extending upwardly from the wing, springs engaging the yokes for retarding the upward swinging of the tongues relative to the axle, a stem journaled in the sleeve, and a spindle extending from the stem.

2. The combination with an axle, of a split sleeve, spaced tongues extending from the sleeve and along opposed faces of the axle, a pivotal connection between the tongues and axle, a spacing sleeve between and connected to the tongues, there being an arcuate slot in the axle for said sleeve, spring controlled, slidably connected yokes oppositely disposed and engaging the bottom of the axle and the tops of the tongues respectively for retarding the upward movement of the tongues relative to the axle, a stem revoluble in the split sleeve, and a wheel engaging spindle projecting from the stem.

3. The combination with an axle, of a split sleeve, spaced tongues extending from the sleeve and along opposed faces of the axle, a pivotal connection between the tongues and axle, spring controlled, slidably connected yokes oppositely disposed and engaging the bottom of the axle and the tops of the tongues respectively for retarding the upward movement of the tongues relative to the axle, a spindle carrying stem revoluble within the sleeve, a rod connected at its ends to the stem above and below the sleeve and having an eye portion below the level of the stem, and a spring constantly under tension and extending upwardly and inwardly from the eye.

In testimony that I claim the foregoing as my own, I have hereto affixed my signature in the presence of two witnesses.

JOSEPH D. INGRAM.

Witnesses:
E. C. LACYS,
W. A. ASKEW.